(12) United States Patent
Hiruma et al.

(10) Patent No.: US 6,212,968 B1
(45) Date of Patent: Apr. 10, 2001

(54) SCARA ROBOT

(75) Inventors: Kenichiro Hiruma; Shinji Suzuki; Rika Miyazawa; Yoshihito Sakashita; Haruhiko Tanaka; Kikue Hosono, all of Hachioji (JP)

(73) Assignee: Janome Sewing Machine Co., Ltd,, Tokyo (JP)

( * ) Notice: Subject to any disclaimer, the term of this patent is extended or adjusted under 35 U.S.C. 154(b) by 0 days.

(21) Appl. No.: 09/353,730

(22) Filed: Jul. 14, 1999

(30) Foreign Application Priority Data

| Jul. 29, 1998 | (JP) | 10-228618 |
| Jul. 29, 1998 | (JP) | 10-228619 |
| Oct. 5, 1998 | (JP) | 10-296225 |

(51) Int. Cl.⁷ ............... B25J 18/00; B25J 9/12; B25J 19/02
(52) U.S. Cl. ............ 74/490.03; 901/9; 901/23; 901/24
(58) Field of Search ............ 74/490.03; 901/9, 901/23, 24

(56) References Cited

U.S. PATENT DOCUMENTS

| 4,260,940 | * | 4/1981 | Engelberger et al. | 318/562 |
| 4,424,473 | * | 1/1984 | Gorman | 318/568.11 |
| 4,568,238 | * | 2/1986 | Hirano et al. | 414/744.3 |
| 4,787,813 | * | 11/1988 | Stevens et al. | 414/744.5 |
| 5,944,476 | * | 8/1999 | Bacchi et al. | 414/783 |

* cited by examiner

Primary Examiner—Allan D. Herrmann
(74) Attorney, Agent, or Firm—Nields & Lemack

(57) ABSTRACT

Disclosed is a SCARA robot having a robot body, a mount movable vertically of the robot body, a first arm having one end operatively connected to the mount such that the first arm may turningly move in a horizontal plane, a second arm having one end operatively connected to the opposite end of the first arm such that the second arm may turningly move in a horizontal plane, and an R shaft rotatably mounted on the free end of the second arm, wherein stepping motors 12, 22, 32 and 42 are provided to move the first and second arms, the R-shaft and the mount respectively, and encoders are provided to count the stepping pulses of the stepping motors. The counted pulses are feedbacked to CPU1 so that the CPU1 may correct errors when the errors are detected between the counted number of pulses and a required number of pulses. When the errors are detected, the stepping motors may be stopped and the errors may be indicated.

9 Claims, 7 Drawing Sheets

SCARA ROBOT

BACKGROUND OF THE INVENTION AND RELATED ART STATEMENT

The present invention relates to a SCARA robot.

The SCARA robot (Selective Compliance Assembly Robot Arm) is generally known as a robot having multi-joint arms which may be moved in a horizontal plane. More precisely the SCARA robot has a first arm having one end articulated to a mount of the robot and a second arm having one end articulated to the opposite end of the first arm and having an R shaft rotatably mounted on the free end thereof so that the R shaft may be rotationally operated to work. In addition to the three articulation axes, the mount may be moved vertically of the robot body. Thus the robot is generally of three (3) or four (4)-axis type. Conventionally the SCARA robot has been generally operated by the servomotor type of drive sources.

The servomotor is generally big sized and the control device is accordingly required to be big sized. The SCARA robot is, therefore, eventually considerably bulky requiring so much consumption of electric power. Further, the servomotors are normally mounted on the arm side of the robot. The SCARA robot is, therefore, required to be constructed solid and strong enough to support such big and heavy servomotors and the corresponding big sized control device for supplying electric power to the servomotors. This is because the SCARA robot is destined to be bulky.

Instead of the servomotors, stepping motors may be employed to reduce the size of the SCARA robot. However if there is not a position confirmation function provided, it is always required to revert to the initial set at the first step of control routine to control the stepping amount of the stepping motors at each moving step thereof, that is, to control the moving amount of the stepping motors on the basis of a reference position.

Further, the SCARA robot driven by AC servomotors is designed to automatically operate within a predetermined performance area irrespectively of some obstacles or persons that may happen to be within the performance area. This will cause damages to things or hurt the persons. It has been often required to make the indication of "Keep Off".

The invention has been provided to eliminate the defects and disadvantages of the prior art. It is, therefore, a primary object of the invention to provide a SCARA robot which is mechanically compact and small sized.

It is another object of the invention to provide stepping motors for driving the essential elements of the robot.

It is another object of the invention to provide sensors for detecting the moving amount of the steeping motors, thereby to eliminate the necessity of reverting to the initial set at the first step of the control routine of the stepping motors at each moving step thereof, thus to secure the correct movements of the essential elements of the robot.

It is another object of the invention to compare the required moving amount and the actual moving amount of the stepping motors and correct the errors, if any, thereby to secure the correct movements of the essential elements of the robot.

It is another object of the invention to stop the stepping motors if the errors are detected in stepping movement of the stepping motors.

It is another object of the invention to indicate the errors detected in stepping movement of the stepping motors.

It is still another object of the invention to provide a means for driving the stepping motors at a reduced speed to confirm if the essential elements of the robot operates within a predetermined performance area.

SUMMARY OF THE INVENTION

In order to realize the objects of the invention as mentioned above, a SCARA robot having a robot body, a mount provided on the robot body, a first arm having one end operatively connected to the mount such that the first arm may turningly move in a horizontal plane, a second arm having one end operatively connected to the opposite end of the first arm such that the second arm may turningly move in a horizontal plane, and an R shaft rotatably mounted on the free end of the second arm, the SCARA robot substantially comprising a first stepping motor arranged in the mount for moving the first arm, a second stepping motor arranged in the mount for moving the second arm, sensor means for detecting the stepping amount of the stepping motors, and means operated in response to the signals from the sensor means, thereby to detect the positions of the first and second arms respectively.

DETAILED DESCRIPTION OF PREFERRED EMBODIMENTS

Figure 1:
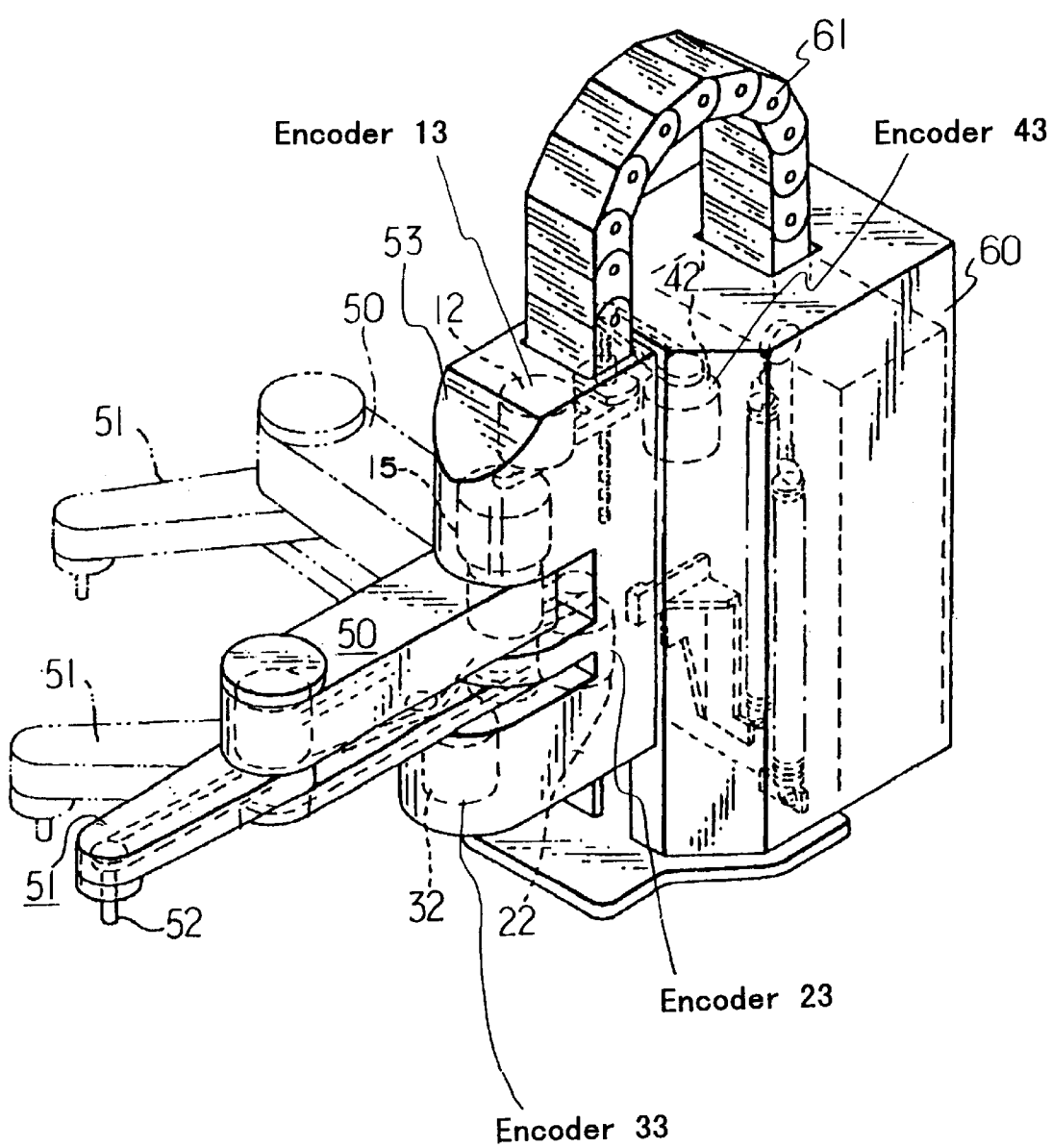
FIG. 1 is a perspective view of the SCARA robot of the invention.

The invention will now be described in reference to the attached drawings. In FIG. 1, the robot has a robot body 60 and a mount 53 which is provided on the robot body such that the mount may be movable vertically of the robot body. A first arm 50 has one end operatively connected to the mount 53 such that the first arm may be turningly movable on the mount in a horizontal plane. A second arm 51 has one end operatively connected to the opposite end of the first arm 50 such that the second arm may be turningly movable on the first arm in a horizontal plane. An R-shaft 52 is rotatably mounted on the free end of the second arm 51. The R-shaft is rotationally operated to actually work. A flexible casing 61 is extended between the robot body 60 and the mount 53 for accommodating therein the wiring of the robot.

A stepping motor 42 is provided in the robot body 60 for moving the mount 53 vertically of the robot body 60. Another stepping motor 12 is provided in the mount 53 and is operatively connected to the first arm 50 through a reduction device 15 such that the stepping motor 12 is driven to turningly move the first arm in a horizontal plane on the mount 53.

Another stepping motor 22 is provided in the mount 53 and is operatively connected to the second arm 51 through a transmission device including a transmission belt such that the stepping motor 22 is driven to turningly move the second arm 55 in a horizontal plane on the first arm 50. Another stepping motor 32 is provided in the mount 53 and is operatively connected to the R-shaft 52 through a transmission device including a transmission belt such that the stepping motor 32 is driven to rotate the R-shaft 52.

With the mechanical construction as described above, the robot is, as shown in FIG. 2, provided with a CPU1 which is operated to in response to the signals or commands from RAM2, ROM3 and/or a memory card 4 to control the operations of the essential elements of the robot including a drive mechanism 10 for moving the first arm 50 as mentioned above, another drive mechanism 20 for moving the second arm 51 as mentioned above, another drive mechanism 30 for rotating the R-shaft 52 as mentioned above, and another drive mechanism 40 for moving the mount 53 as mentioned above. The drive mechanism 10 includes a drive motor control device 11 which is operated in response to the commands from the CPU1 to drive the stepping motor 12, thereby to move the first arm 50 for a predetermined distance. The stepping movement of the stepping motor 12 is detected by an encoder 13 and feedbacked to the CPU 1. An initial set sensor 14 is provided to detect if the stepping motor 12 is set to the initial position.

The other drive mechanisms 20, 30 and 40 are all the same with the drive mechanism 10 with respect to the components included therein although the designating reference numerals are different from each other.

Figure 3:
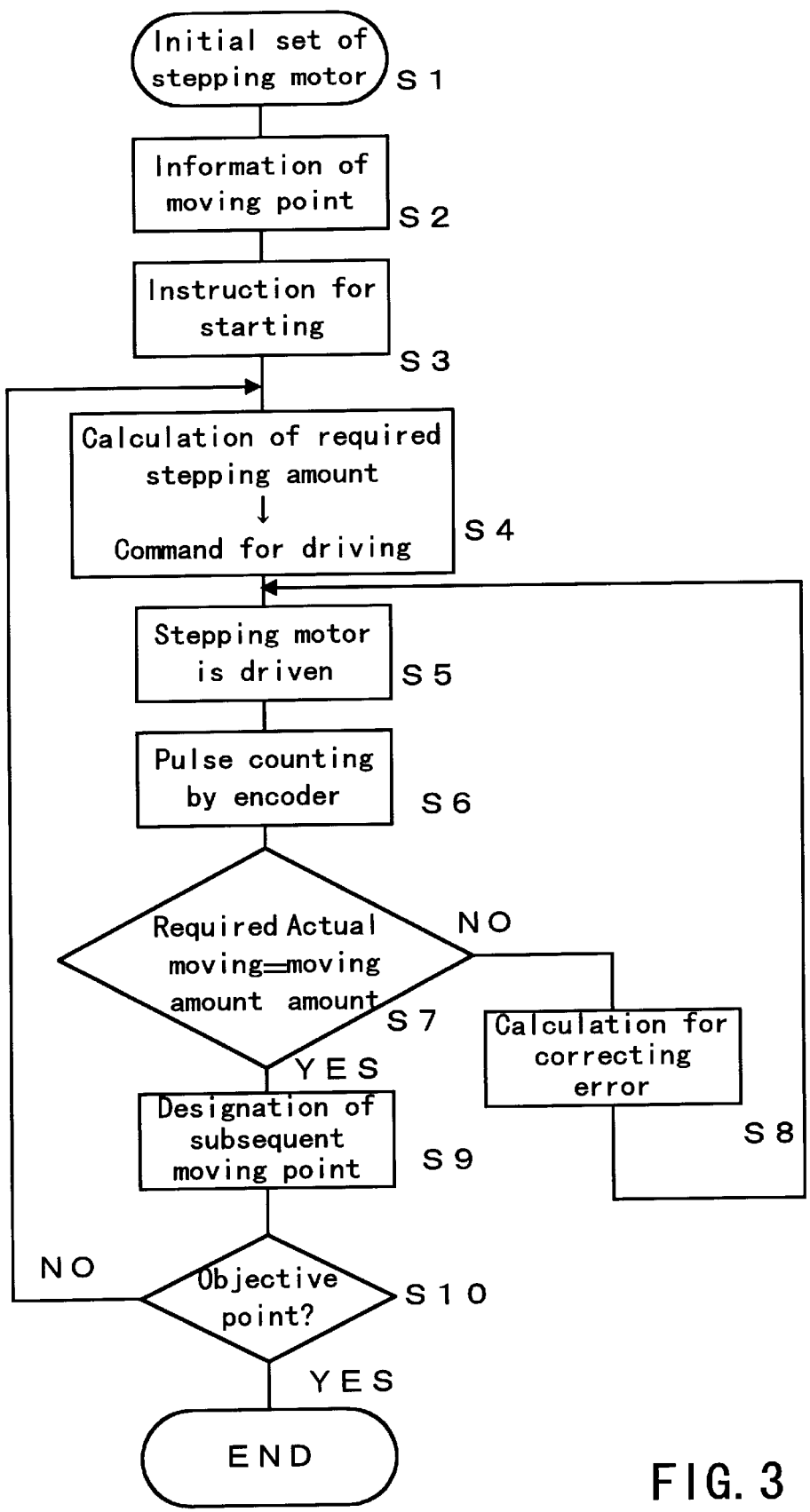
FIG. 3 is a flow chart showing the operations of the first embodiment of the invention.

In reference to FIG. 3, the operations are as follows:

With the electric power being supplied, the stepping motors are initialized (step S1). The operator inputs information for moving points (step S2), and gives an instruction for starting (step S3). The CPU1 is operated in response to the start instruction to calculate the stepping amounts of the stepping motors to give the commands to the stepping motors 12, 22, 32 and 42 respectively (step S4). The stepping motors 12, 22,32 and 42 are driven in accordance with the commands from the CPU1 (step S5). The encoders 13, 23, 33 and 43 starts to count the stepping pulses of the stepping motors 12, 22,32 and 42 respectively (step S6) and feedback the counts to the CPU1 (step S6). The CPU1 compares the number of the actual stepping pulses with the required number of the stepping pulses (step S7). If the compared numbers are not equal with each other, the errors are corrected (step S8), and the stepping motors are driven with the corrected values (step S5). On the other hand, if the compared numbers are equal with each other, the subsequent moving point is designated (step S9). The operations from step S4 to step 9 are repeated until the stepping motors come to reach the final objective points (step S10).

Thus according to the invention, since the errors are found, if any, during the stepping movements of the stepping motors and corrected to normally drive the stepping motors, a high precision control of the robot may be obtained. Moreover the first step S1 need not be reverted to correct the errors each time the errors are detected.

Figure 2:
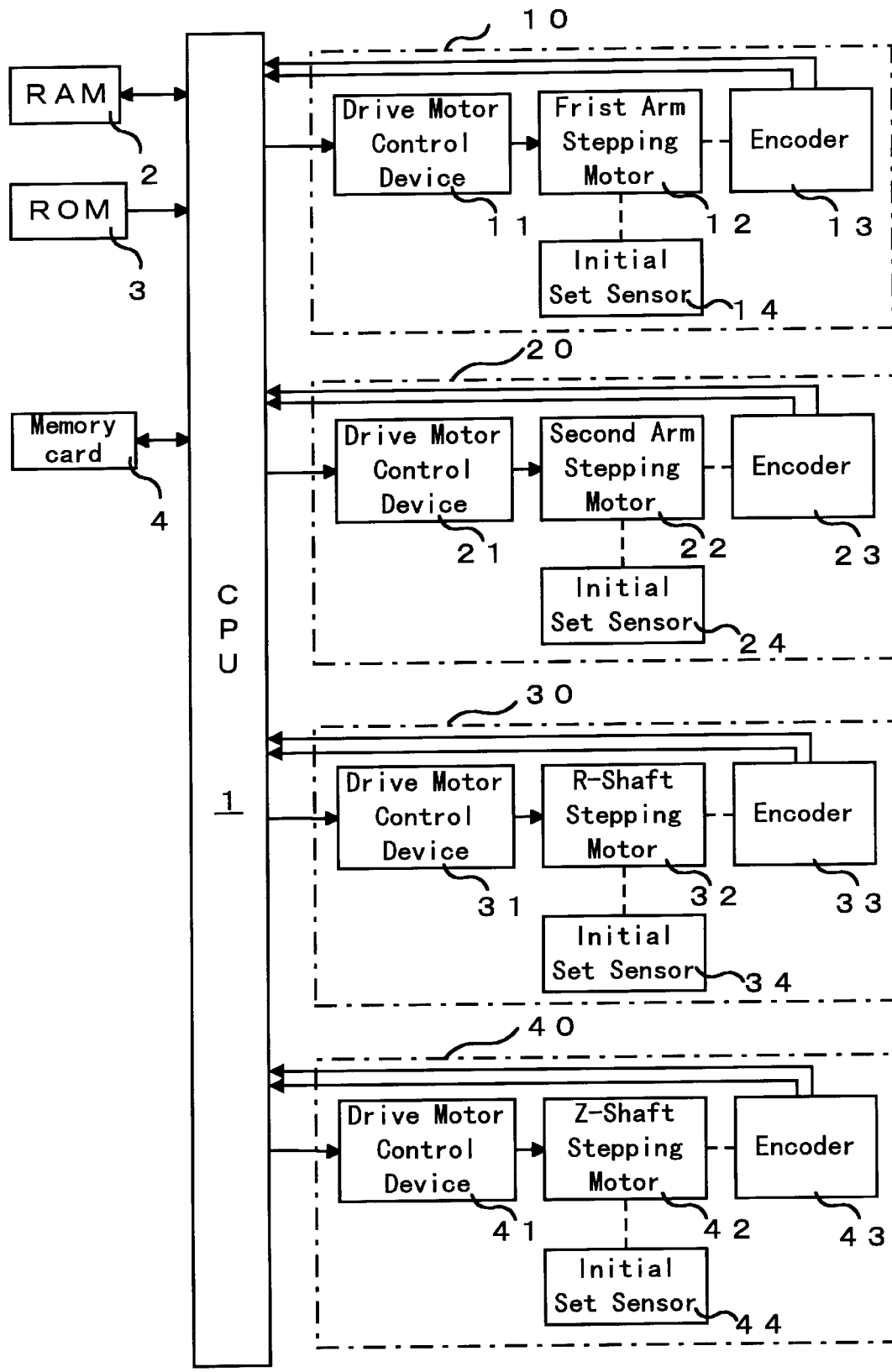
FIG. 2 is a block diagram showing a first embodiment of the invention.
Figure 4:
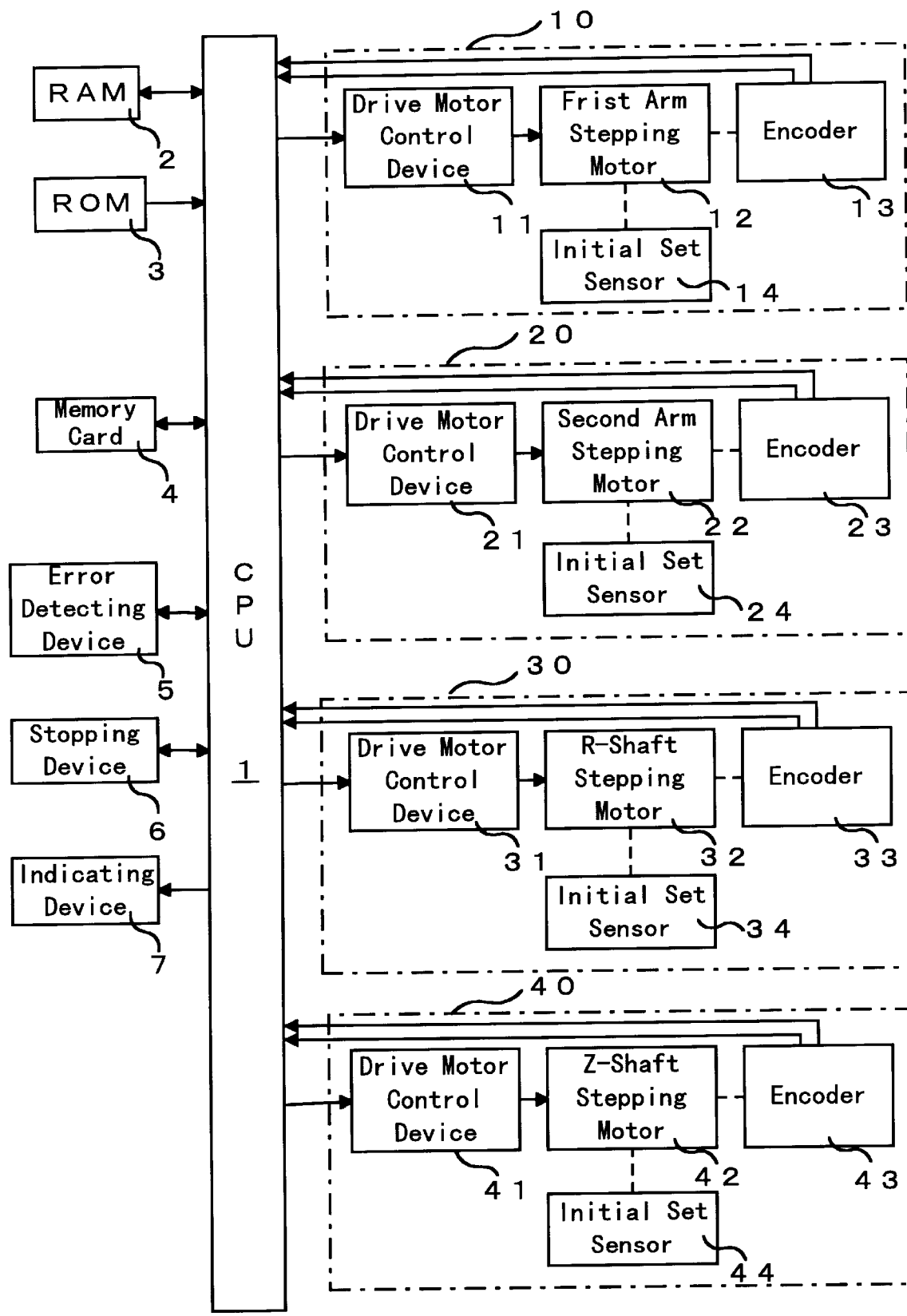
FIG. 4 is a block diagram showing a second embodiment of the invention.
Figure 5:
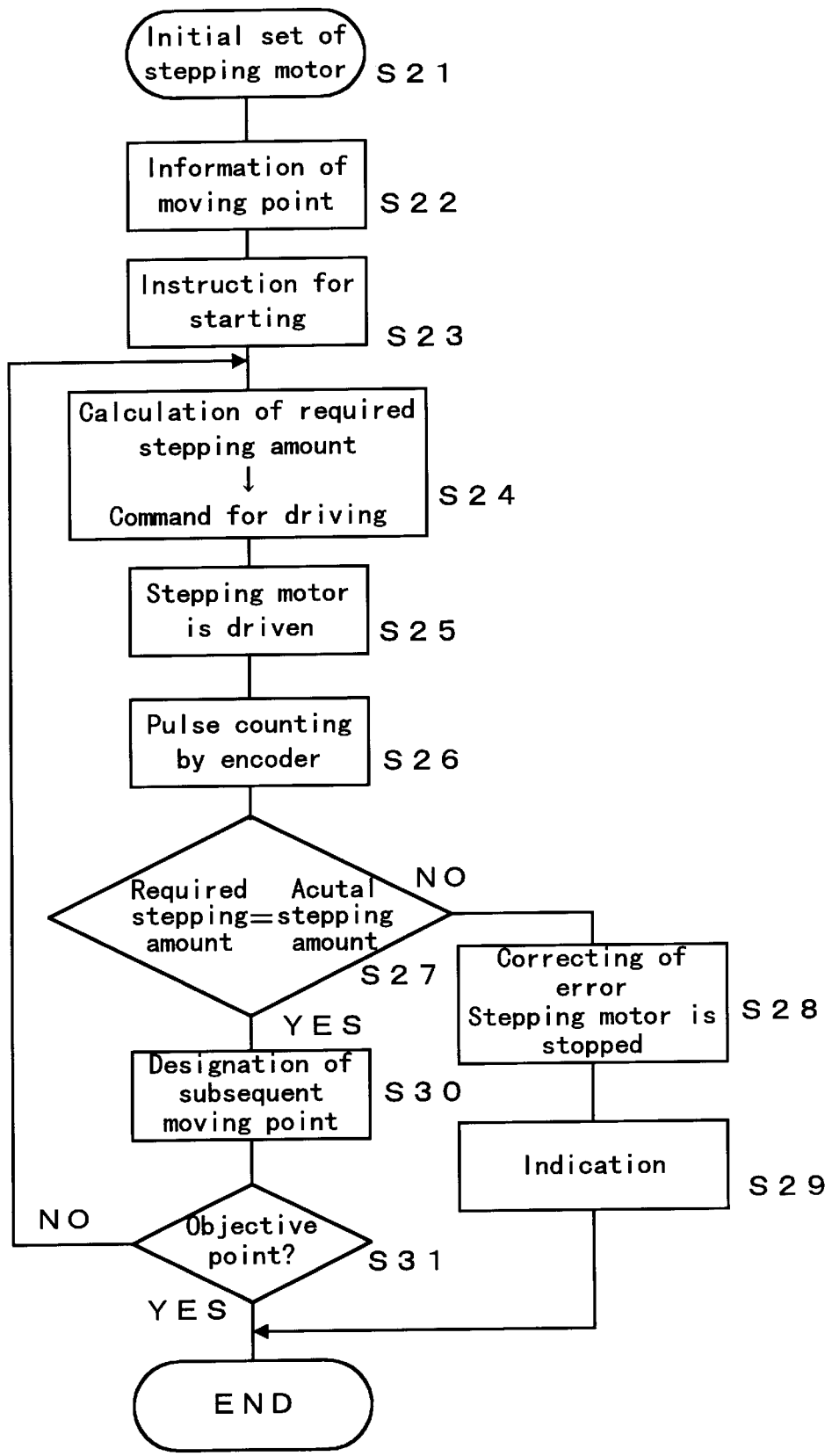
FIG. 5 is a flow chart showing the operations of the second embodiment of the invention.

In FIGS. 4 and 5 showing a second embodiment of the invention, an error detecting device 5, a stopping device 6 and an indicating device 7 are additionally provided to the first embodiment of the invention as shown in FIG. 2. The error detecting device 5 is designed to compare the number of the actual stepping pulses with the required number of the stepping pulses. If the compared numbers are not equal with each other, the error detecting device 5 gives the error signals to the CPU1, which is then actuated to operate the stopping device 6 to stop the stepping motors 12, 22, 32 and 42. Simultaneously the indicating device 7 is operated to make an error indication by way of optical or sound indication means. The other operations of the second embodiment are same with those of the first embodiment.

According to the second embodiment of the invention, if some obstacle happens to be within a predetermined performance area of the robot, the essential elements of the robot touch the obstacle to cause errors in the stepping movements of the stepping motors, thereby to stop the stepping motors without forcing the robot to continue the operations, and simultaneously indicate the errors.

Figure 6:
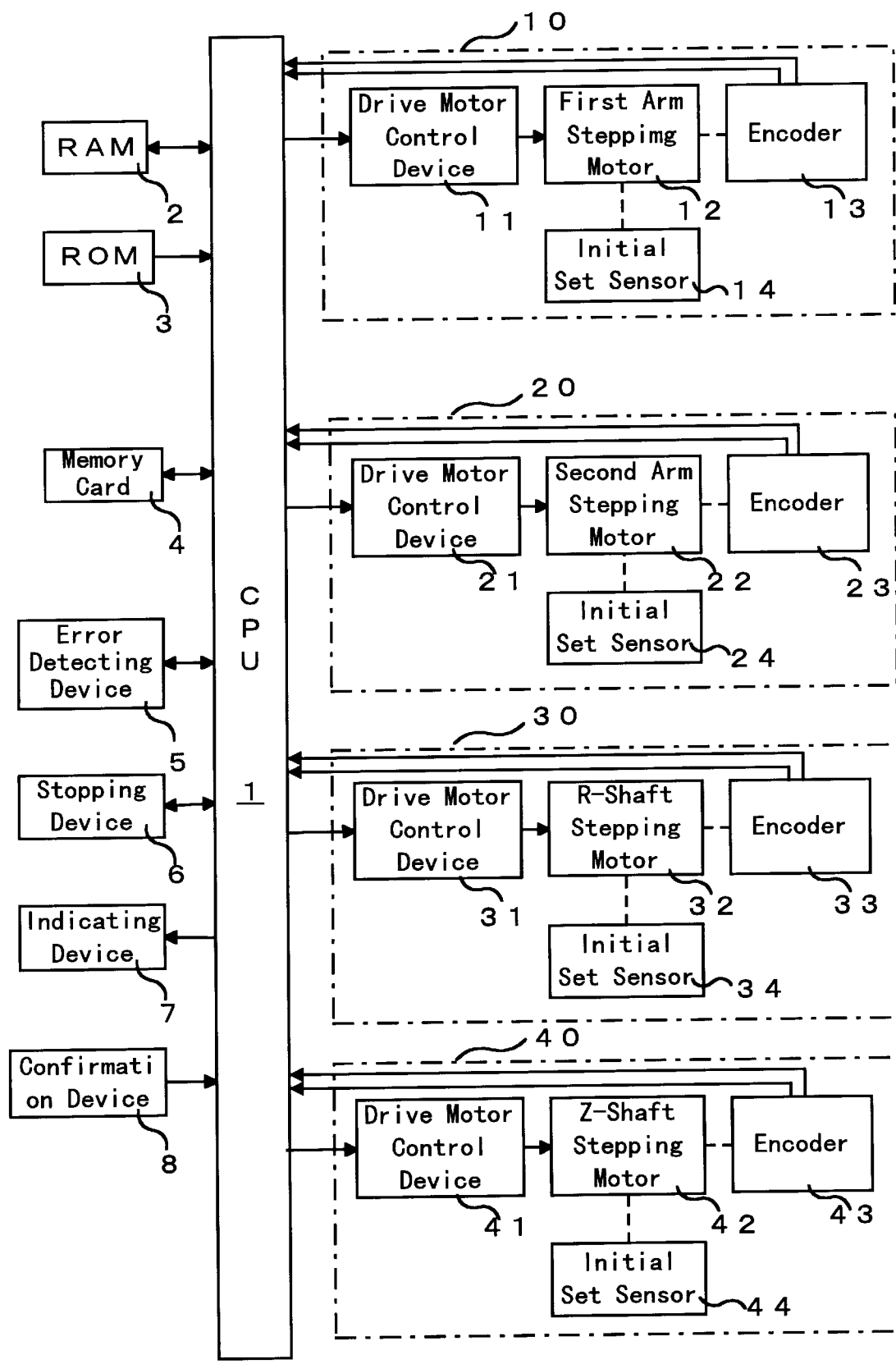
FIG. 6 is a block diagram showing a third embodiment of the invention.
Figure 7:
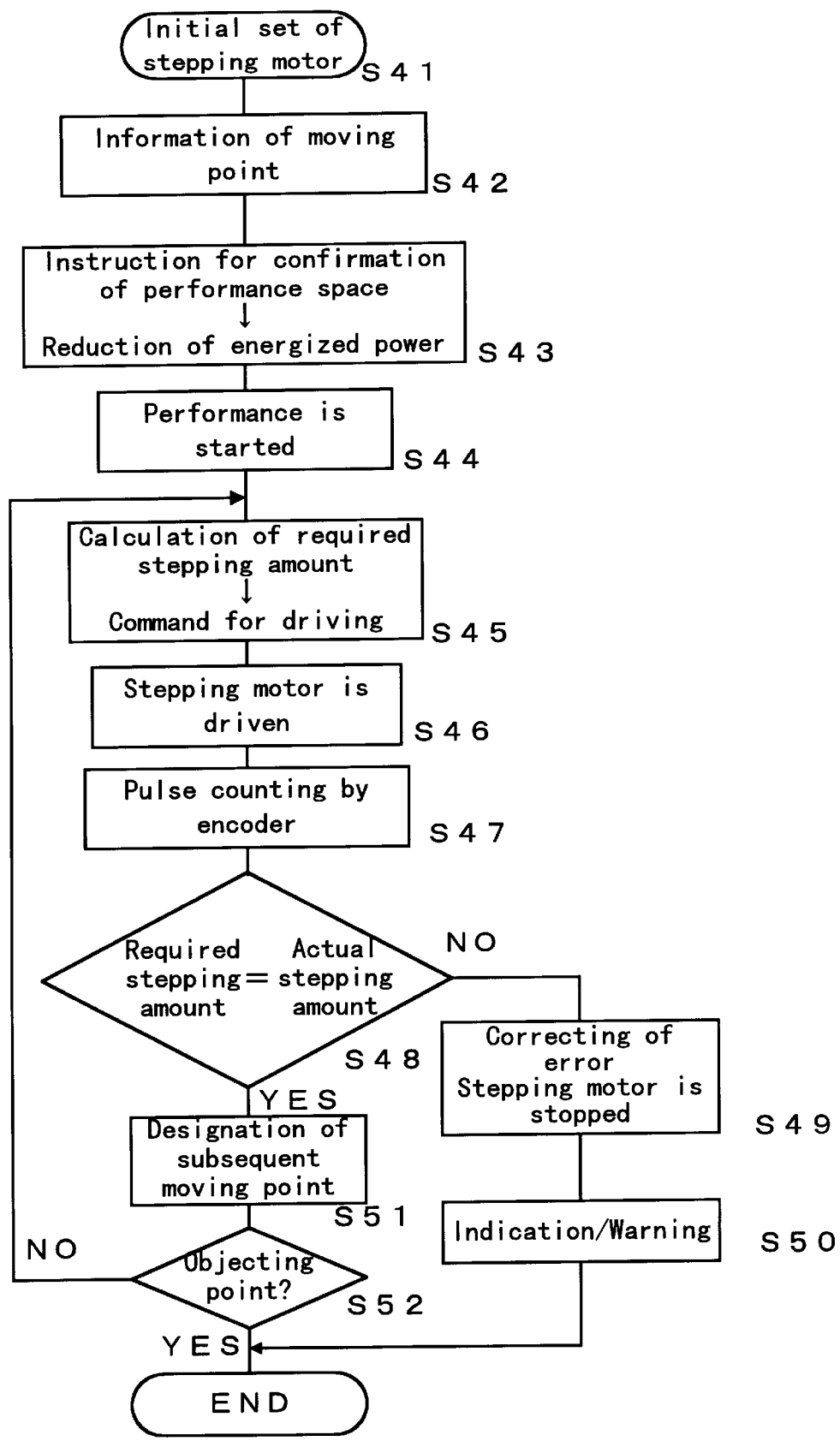
FIG. 7 is a flow chart showing the operations of the third embodiment of the invention.

In FIGS. 6 and 7 showing a third embodiment of the invention, a confirmation device 8 is additionally provided to the second embodiment of the invention as shown in FIGS. 4 and 5. In the third embodiment, the confirmation device 8 is provided to operate the robot in a safety confirmation mode. In this case, the operator inputs the information at step S43 such that the drive motors 12, 22, 32 and 42 will be driven with a reduced speed within a predetermined area. The other operations are same with those of the second embodiment of the invention. With the robot being operated in this safety confirmation mode prior to actually driving the robot to work, the operator can know that the robot will normally operate with safety secured.

The invention being thus described, it will be obvious that the same may be varied in many ways. Such variations are not regarded as a departure from the spirit and scope of the invention, and all such modifications are intended to be included within the scope of the following claims.

What is claimed is:

1. A selective compliance assembly robot arm robot having a robot body, a mount, a first arm having one end operatively connected to the robot body such that the first arm may turningly move in a horizontal plane , a second arm having a free end and one end operatively connected to the opposite end of the first arm such that the second arm may turningly move in a horizontal plane, and an R shaft rotatably mounted on said free end of the second arm, said robot comprising a first stepping motor arranged in said mount for moving said first arm, a second stepping motor arranged in said mount for moving said second arm, sensor means for detecting the stepping amounts of the stepping motors, and detecting means operated in response to the signals from the sensor means, thereby to detect the positions of the first and second arms respectively.

2. A selective compliance assembly robot arm robot as defined in claim 1, further comprising a third stepping motor arranged in said mount for rotating said R-shaft and another sensor means arranged in said mount for detecting the stepping amount of said third stepping motor.

3. The selective compliance assembly robot arm robot as defined in claim 1, further comprising a mount provided to move vertically of said robot body, said mount supporting one end of said first arm such that said first arm may turningly move in a horizontal plane, said second arm having one end operatively connected to the opposite end of the first arm such that the second arm may turningly move in a horizontal plane, a fourth stepping motor arranged in said robot body for moving said mount, and another sensor means for detecting the stepping amount of said fourth stepping motor.

4. A selective compliance assembly robot arm robot having a robot body, a first arm having one end operatively connected to the robot body such that the first arm may turningly move in a horizontal plane, a second arm having a free end and one end operatively connected to the opposite end of the first arm such that the second arm may turningly move in a horizontal plane, and an R shaft rotatably mounted on said free end of the second arm, said robot comprising drive sources including a first stepping motor for moving said first arm, a second stepping motor for moving said second arm, sensor means for detecting the stepping amounts of the stepping motors, and detecting means operated in response to the signals from the sensor means to compare the actual stepping amounts and required stepping amounts of said stepping motors, thereby to detect if said stepping motors have been correctly driven.

5. The selective compliance assembly robot arm robot as defined in claim 4, further comprising stop means for stopping said drive sources when said detecting means detect errors between the actual stepping amounts and required stepping amounts of said stepping motors.

6. The selective compliance assembly robot arm robot as defined in claim 4, further comprising indicating means for indicating the errors when said detecting means detect errors between the actual stepping amounts and required stepping amounts of said stepping motors.

7. A selective compliance assembly robot arm robot having a robot body, a first arm having one end operatively connected to the robot body such that the first arm may turningly move in a horizontal plane, a second arm having a free end and one end operatively connected to the opposite end of the first arm such that the second arm may turningly move in a horizontal plane, and an R shaft rotatably mounted on said free end of the second arm, said robot comprising drive sources including a first stepping motor for moving said first arm, a second stepping motor for moving said second arm, sensor means for detecting the stepping amount of the stepping motors, reduction means operated to move said stepping motors at a speed lower than a normal speed of said stepping motors, and detecting means operated in response to the signals from the sensor means to compare the actual stepping amounts and required stepping amounts of said stepping motors, thereby to detect if said stepping motors have been correctly driven.

8. The selective compliance assembly robot arm robot as defined in claim 7, further comprising means for defining an area in which said first and second arms can move.

9. The selective compliance assembly robot arm robot as defined in claim 7, further comprising indicating means for indicating the errors when said detecting means detect errors between the actual stepping amounts and required stepping amounts of said stepping motors.

\* \* \* \* \*